March 24, 1931.  R. G. CLARK  1,797,679
BOTTLE CAPPING MACHINE
Filed Feb. 9, 1922    8 Sheets-Sheet 6

Inventor:
Robert G. Clark
by his attorneys
Bros Seward

March 24, 1931.  R. G. CLARK  1,797,679
BOTTLE CAPPING MACHINE
Filed Feb. 9, 1922   8 Sheets-Sheet 7
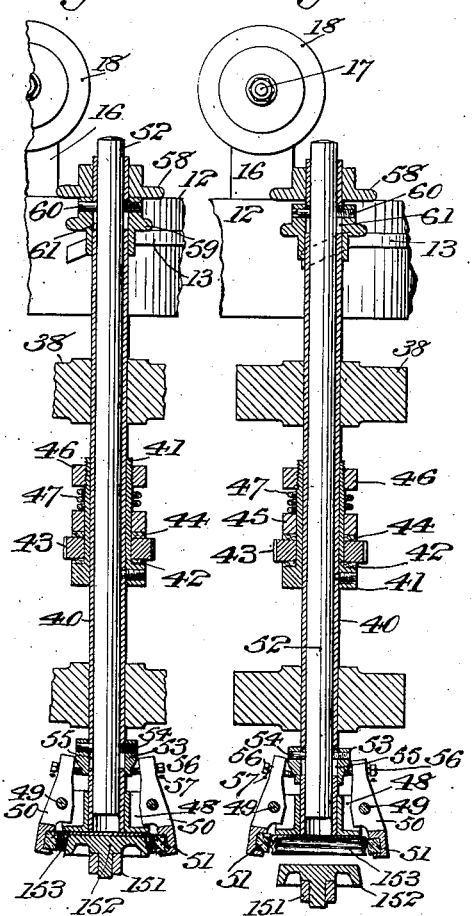
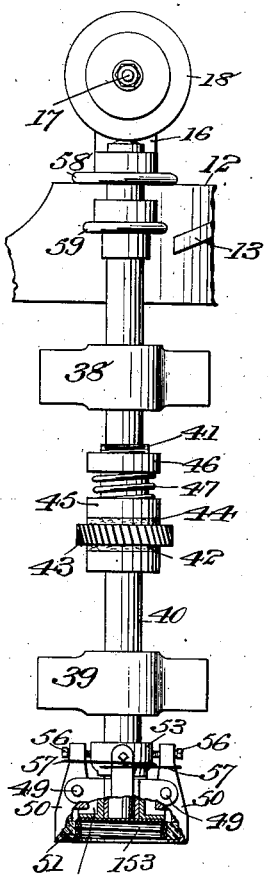
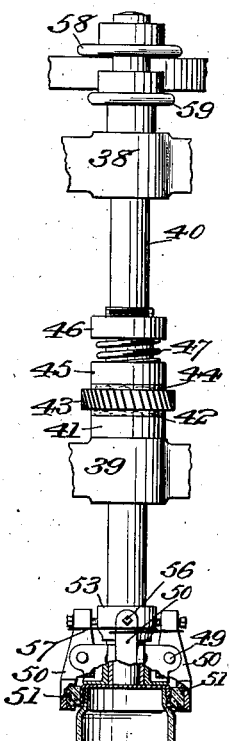
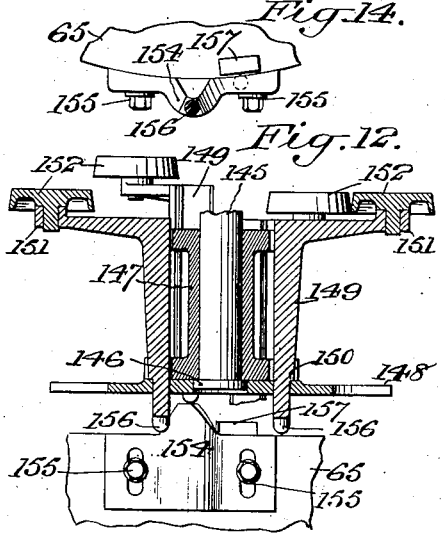
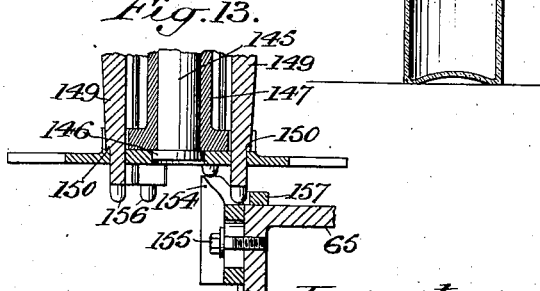
Inventor:-
Robert G. Clark
by his attorney

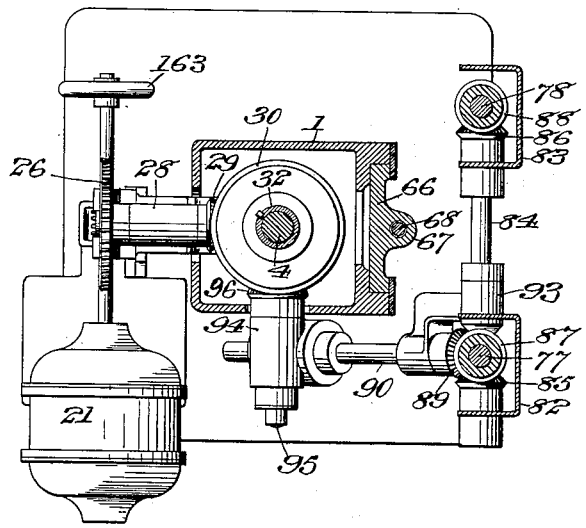
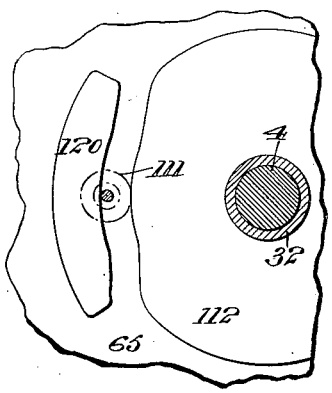
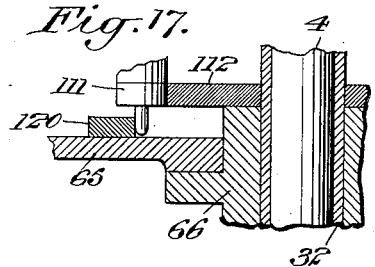
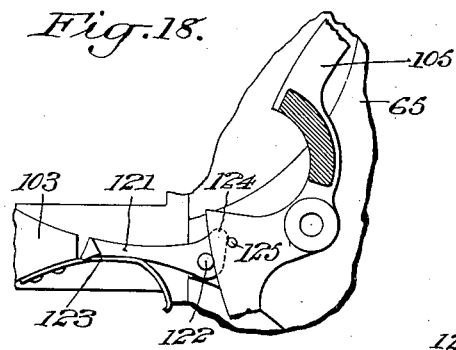
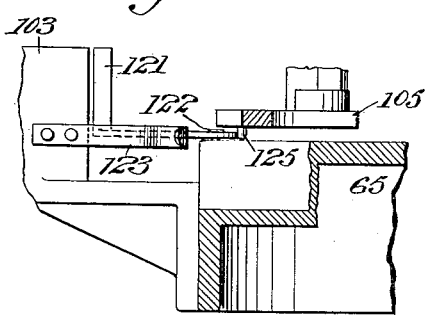
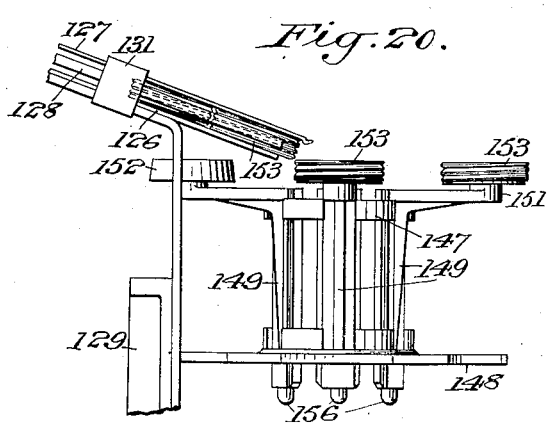

Patented Mar. 24, 1931

1,797,679

UNITED STATES PATENT OFFICE

ROBERT G. CLARK, OF BROOKLYN, NEW YORK, ASSIGNOR, BY MESNE ASSIGNMENTS, TO ANCHOR CAP & CLOSURE CORPORATION, OF LONG ISLAND CITY, NEW YORK, A CORPORATION OF NEW YORK

BOTTLE-CAPPING MACHINE

Application filed February 9, 1922. Serial No. 535,244.

This invention relates to a capping machine and, more particularly, to a machine for applying caps to receptacles wherein both longitudinal and rotary movements are employed, such, for instance, as in the application of a screw threaded cap to a bottle or jar.

An object of the invention is to provide a machine of this character in which both the caps and receptacles are automatically fed into and out of the machine; in which the action is positive and efficient; which provides a very tight application of the cap to the receptacle without danger of injury to any parts; and which is exceedingly rapid in operation.

Another object consists in providing certain novel devices, and certain improvements in the form, construction and arrangement of the several parts, whereby the above named, and other objects inherent in the structure, may be obtained.

Other and further objects of the invention will be obvious upon an understanding of the illustrative embodiment about to be described or will be indicated in the appended claims, and various advantages not referred to herein will occur to one skilled in the art upon employment of the invention in practice.

A practical embodiment of the invention is represented in the accompanying drawings in which Fig. 1 represents a top plan view of the machine.

Fig. 8 represents an enlarged detail section of the cap applying mechanism and connected parts.

Fig. 9 represents a view similar to Fig. 8, with the parts in different positions.

Fig. 10 represents an elevation, partly in section, of the elements shown in Figs. 8 and 9, with the parts in different positions.

Fig. 11 represents a view similar to Fig. 10, with the parts in still different positions, and showing the cap applied to the receptacle.

Fig. 12 represents an enlarged detail section, partly in elevation, of the means for feeding the caps to the cap applying mechanism.

Fig. 13 represents an enlarged detail section of part of the elements shown in Fig. 12, taken at right angles to Fig. 12.

Fig. 14 represents an enlarged detail plan view of the cam for actuating the feeding device shown in Fig. 12.

Fig. 15 represents a horizontal section taken in the plane of the lines XV—XV of Fig. 3, looking in the direction of the arrows.

Fig. 16 represents an enlarged detail plan view of the cam mechanism for actuating the receptacle gripping jaws.

Fig. 17 represents an enlarged detail sectional view of the same.

Fig. 18 represents an enlarged detail plan view of the stop mechanism forming a part of the feed for the receptacles.

Fig. 19 represents an enlarged detail sectional view, partly in elevation, of the same, and Fig. 20 represents an enlarged detail elevation of the means for feeding the caps into the machine and conveying them to the cap applying mechanism.

Figure 5:
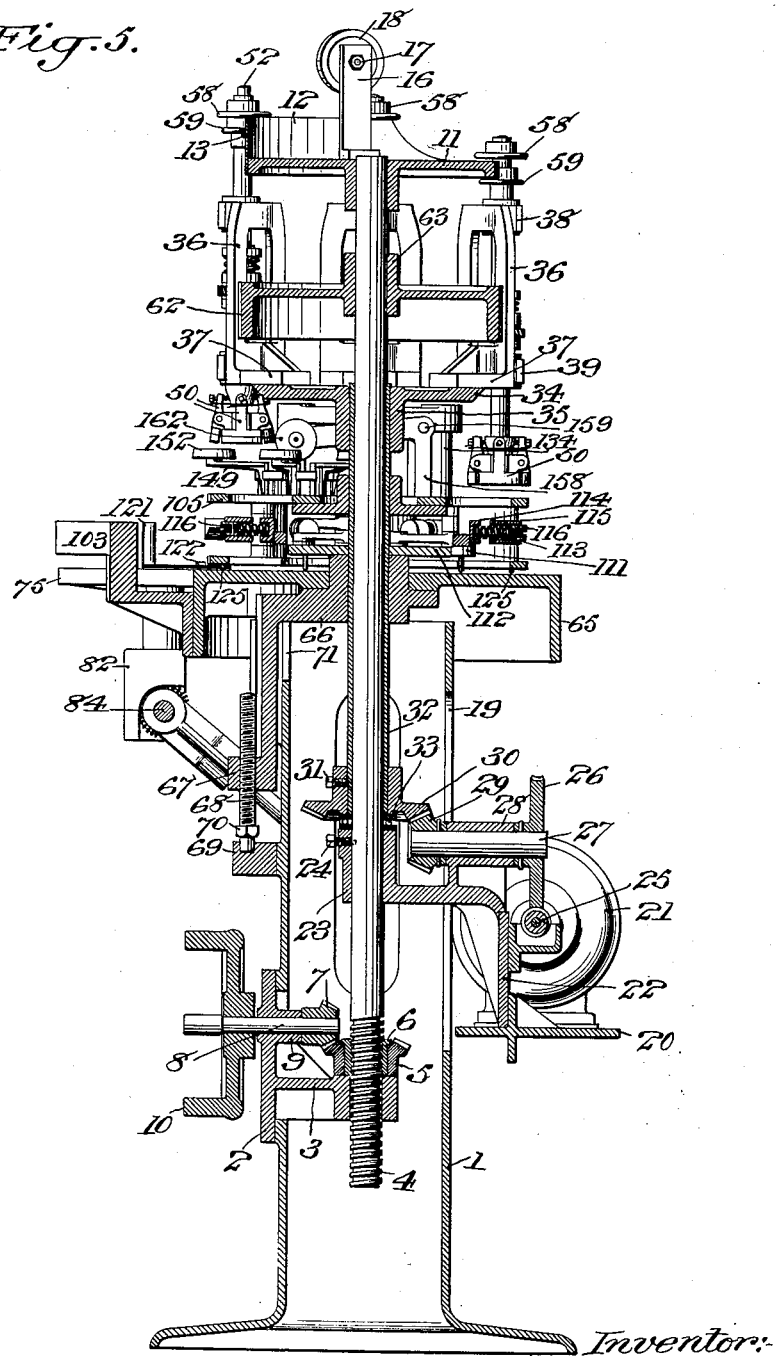
Fig. 5 represents a view similar to Fig. 4, but taken in the plane of the lines V—V of Fig. 1, looking in the direction of the arrows.

Referring to Fig. 5, it will be observed that the machine includes a hollow base 1, which is designed to support the various parts of the apparatus. At one side, and near the bottom, the base is provided with an aperture, over which is secured a plate 2, that carries a bracket 3. The said bracket is bored to receive the threaded end of a rod 4 with a sliding fit. A bevel gear 5 rests on top of the bracket 3 and carries a threaded nut 6 which mates with the rod 4. This gear 5 is in mesh with another bevel gear 7 that is fixed on a short shaft 8 carried in a journal 9 which is formed integral with the plate 2. A hand wheel 10 is fixed to the outer end of the shaft 8, and it will be clear that, by rotating the said wheel, the vertical adjustment of the rod 4 with respect to the base 1 may be varied.

At the upper end of the rod 4, there is fixed a disk 11, to the periphery of which is secured a double cam 12. I refer to this as a double cam because its upper edge acts as a cam surface while a rib 13 (plainly shown in Fig. 2) is formed on the outside thereof to also act as a cam surface. At a point adjacent one end of the cam rib 13, a yoke 14, of inverted U shape, is secured to the disk 11, and carries at its free end, a short cam section 15, which corresponds to and supplements the cam rib 13, at this point; thereby providing, in effect, a box cam for a portion of the length of the cam rib 13.

At another point on the circumference of the disk 11, there is secured an upright 16 to which is pivoted at 17, a roller 18, which is preferably provided with a yielding surface, such as rubber.

The base 1 has an opening 19 formed in its side opposite the plate 2. A shelf 20, which supports a motor 21 that may conveniently be employed as a source of power for the machine, is secured to a bracket 22, which has a right angle formation and projects into the base 1 through the opening 19, where its inner end is formed into a sleeve 23 surrounding the rod 4. A heavy set screw 24 is threaded in the sleeve 23 and adapted to enter the rod 4 in order to provide means of support for the bracket 22 and motor carried thereby.

The drive shaft of the electric motor carries a worm 25, which meshes with a worm wheel 26 that is secured to a shaft 27, which is journalled in a bearing 28 integrally formed with the bracket 22. The inner end of the shaft 27 is provided with a bevel gear 29, which meshes with another gear 30, that is secured by means of a set screw 31 to a hollow shaft 32, which surrounds the rod 4. The gear 30 and lower end of the hollow shaft 32 are rotatably mounted on a ball bearing 33, which rests upon the upper surface of the sleeve portion 23 of the bracket 22. This arrangement of mechanism provides for rotation of the shaft 32 around the rod 4 whenever the motor 21 is running.

The upper end of the hollow shaft 32 carries a head 34, which is secured thereto by any suitable means, such as a set screw or pin, passing through its hub 35, whereby the head is rotated with the shaft 32. This head has, upstanding therefrom, six frameworks 36, each of said frameworks having a base portion 37, which is secured to the head 34 by any suitable means, such as bolts or cap screws. These frameworks carry six cap applying devices. By reference to Fig. 6, it will be noted that these six elements are equally spaced around the circumference of the head 34. As all of the frameworks and cap applying devices are identical, it will suffice to describe but one in detail.

Each framework consists of an open upright portion, at the top and bottom of which are bearings 38, 39. These bearings rotatably support a hollow shaft 40, to the intermediate portion of which is fixed a sleeve 41. The connection between the sleeve 41 and shaft 40 may be by set screw, pin or other suitable contrivance. It will be observed that the lower portion of the sleeve 41 is flanged and fitted to receive a friction disk 42, composed of suitable material, such as leather. A helical gear 43 is loosely fitted on the sleeve 41 and rests upon the friction disk 42. Another friction disk 44 rests upon the top of the gear 43 and contacts with a collar 45 that is slidably mounted on the sleeve 41. The upper end of the said sleeve is threaded and receives a threaded collar 46, while an expansion spring 47 is interposed between the collars 45 and 46. The construction just described constitutes a friction clutch, whereby the rotation of the gear 43 will rotate the hollow shaft 40 until the resistance to the rotation of the latter overcomes the frictional contact between the disks 42 and 44 and the gear 43. It will be clear that this last named contact may be varied by adjusting the collar 46 and thereby causing the spring 47 to bear with greater or less force upon the disk 44.

At the lower end of the hollow shaft 40, four lugs 48, are fixed, and in each lug, there is pivoted at 49, a jaw 50. These jaws are formed on their lower ends in the shape of a quarter circle and are provided with facings 51, composed of some yielding friction material, such as rubber. As these four jaws are arranged in juxtaposition, they constitute, in effect, a complete circle which is adapted to embrace the caps to be applied. Means is provided for swinging the jaws about their pivots 49 into and out of gripping position, which means consists of a plunger rod 52 that is slidably mounted within the hollow shaft 40, and has a cone 53 fixed to it lower end by a screw 54. The shaft 40 is provided, at this point, with slots 55, in which the screw 54 rides so as to permit reciprocation of the plunger 52 on the shaft. The upper ends of the jaws 50 carry screws 56 which are intended to be engaged by the cone 53 in order to swing the jaws 50 into gripping position, in a well understood manner. Adjustment of the screws 56 will provide for increasing or decreasing the diametrical distance between the jaws. Springs 57, shown in the present case as spring wires connected to opposite pairs of jaws, serve to yieldingly hold the latter out of gripping position, as indicated in Fig. 8.

At the top of the hollow shaft 40, there is secured a flange 58 which may be fixed to rotate with the said shaft by means of screws or pins passing through its hub into contact with the shaft; and a short distance therebelow, another flange 59 is fastened in place by means of a screw 60 which passes completely through the hub of the flange 59 and the plunger 52. Slots 61 are formed in the opposite sides of the shaft 40 in order to provide for the travel of the screw 60 when the plunger 52 moves vertically in the shaft 40, this arrangement being similar to the provision of the slots 55 already mentioned.

It will be noted by reference to Figs. 2, 3, 4 and 5, that the upper ends of the shaft 40 and plunger 52 lie near the periphery of the double cam 12, and the arrangement is such that the flange 58 is fitted to rest upon the upper edge of the said cam while the flange 59 is fitted to rest upon the rib cam 13. The helical gear 43, which has already been described as being in frictional engagement with the shaft 40, meshes with a large and broad-faced helical gear 62, which is immovably fixed on the rod 4 by suitable means, such as a set screw passing through its hub 63. This large gear is well shown in Figs. 3 and 4, and it will be observed that its face is wide enough to permit considerable axial movement of the small gear 43 thereupon, while the two gears remain in mesh.

As already indicated, the frameworks 36, which carry the cap applying devices just described, are arranged on the circumference of the head 34, which is rotated with the hollow shaft 32. Therefore, in as much as the double cam 12 and large gear 62, are held motionless by the rod 4, the said cap applying devices are revolved about the periphery of the said double cam and large gear, with the result that the flanges 58 and 59 ride upon the cam surfaces of the double cam 12, while the hollow shafts 40 are rotated on their own axes because of their frictional engagement with the small gears 43. Furthermore, the plungers 52 come into and out of contact with the roller 18, which is carried by the disk 11 that also supports the double cam 12. This combined revolving and rotary movement of the said parts, with respect to the double cam 12, large gear 62, and roller 18, serves to provide the necessary longitudinal and rotary movement to the caps in order to apply them to the receptacles, as will be hereinafter set forth in describing the operation of the machine.

The means for feeding the receptacles to and from the machine includes a shelf 63 (Fig. 1), which has raised sides and is supported by a bracket 64 (Fig. 3) that is secured to a table 65. This table has a central opening, which fits around the hub of a bracket 66, which hub, in turn, embraces the hollow shaft 32. The bracket 66 has a depending portion which extends downwardly along the base 1 and has a lug 67 formed at its lower end, in which is threaded a jack screw 68, that has its lower end rotatably mounted in a boss 69 secured to the side of the base 1. A nut 70 is formed on the screw 68 in order to operate the same for raising and lowering the bracket 66 and hence, the table 65. The base 1 is recessed as shown at 71 in order to permit this vertical movement of the bracket 66.

The receptacles are shown in dotted lines (Fig. 1) and denoted by 72, and their entrance to and exit from the machine is indicated by arrows. A gate 73 is hinged to one side of the shelf 63, as shown at 74, the said gate extending angularly across the shelf in order to form one side of a channel for guiding the receptacles to the machine.

A pair of feeding disks 75, 76 are provided for carrying the receptacles into and out of the machine. See Figs. 1 and 3. These disks are fixed to shafts 77, 78 (see also Fig. 15) which are mounted in bearings 79, 80 (see Fig. 2) that are secured to the table 65 by bolts 81. The bearings 79, 80 have depending portions 82, 83, which serve to journal and support a transverse shaft 84, which carries bevel gears 85, 86 (Fig. 4) that mesh with gears 87, 88, fixed to the lower ends of the shafts 77, 78. The gear 85 also engages a gear 89, which is fixed to a shaft 90, that is mounted in a bearing 91, carried by a bracket arm 92, the other end of which is supported, as shown at 93, Fig. 15, by the shaft 84. The shaft 90 has its lower end journalled in a casing 94, which casing also serves as a bearing for a transverse shaft 95, which latter has its inner end mounted in the sleeve portion 23 of the bracket 22. The shaft 95 also has a gear 96 fixed thereto, which is in mesh with the gear 30 that is secured to the hollow shaft 32, as also mentioned above; and a spiral gear 97 on the shaft 95 meshes with a spiral gear 98 on the shaft 90. As a result of this construction, it will be plain that the rotation of the main shaft 32 will impart to the feeding disks 75, 76, a suitable rotary motion.

Figure 1:
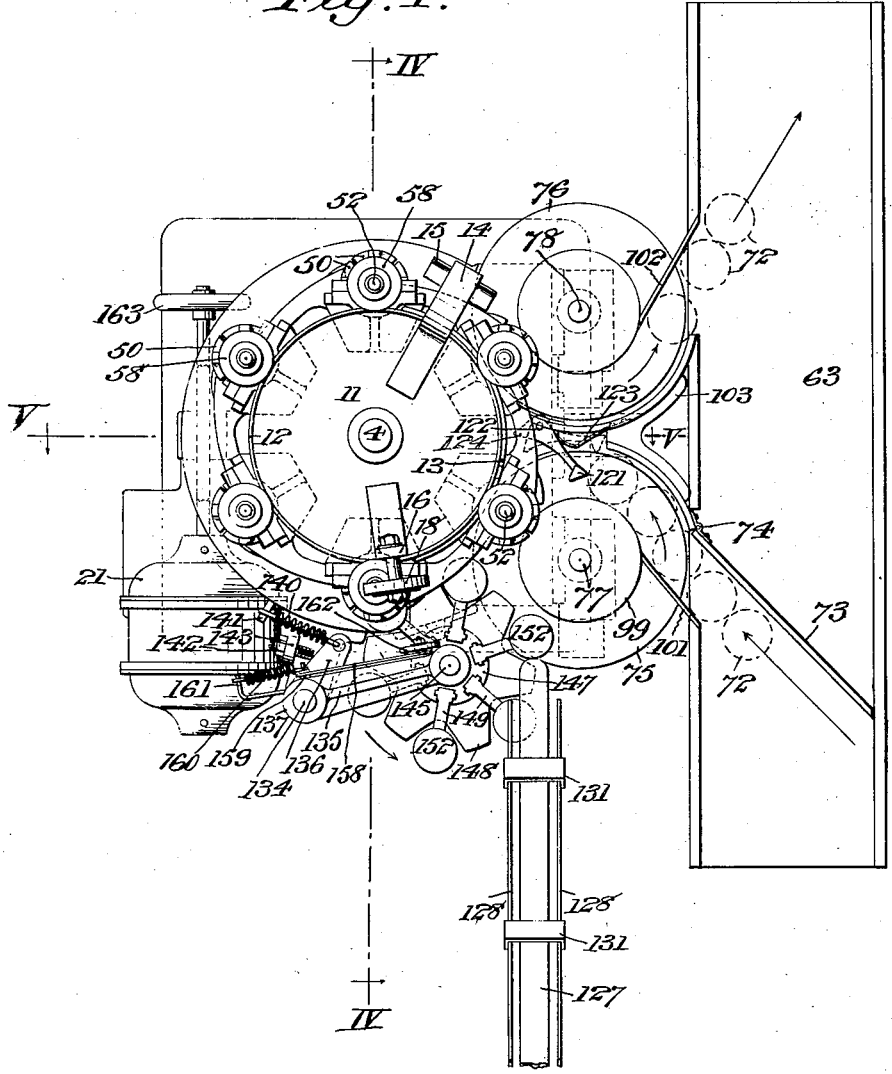
Figure 3:
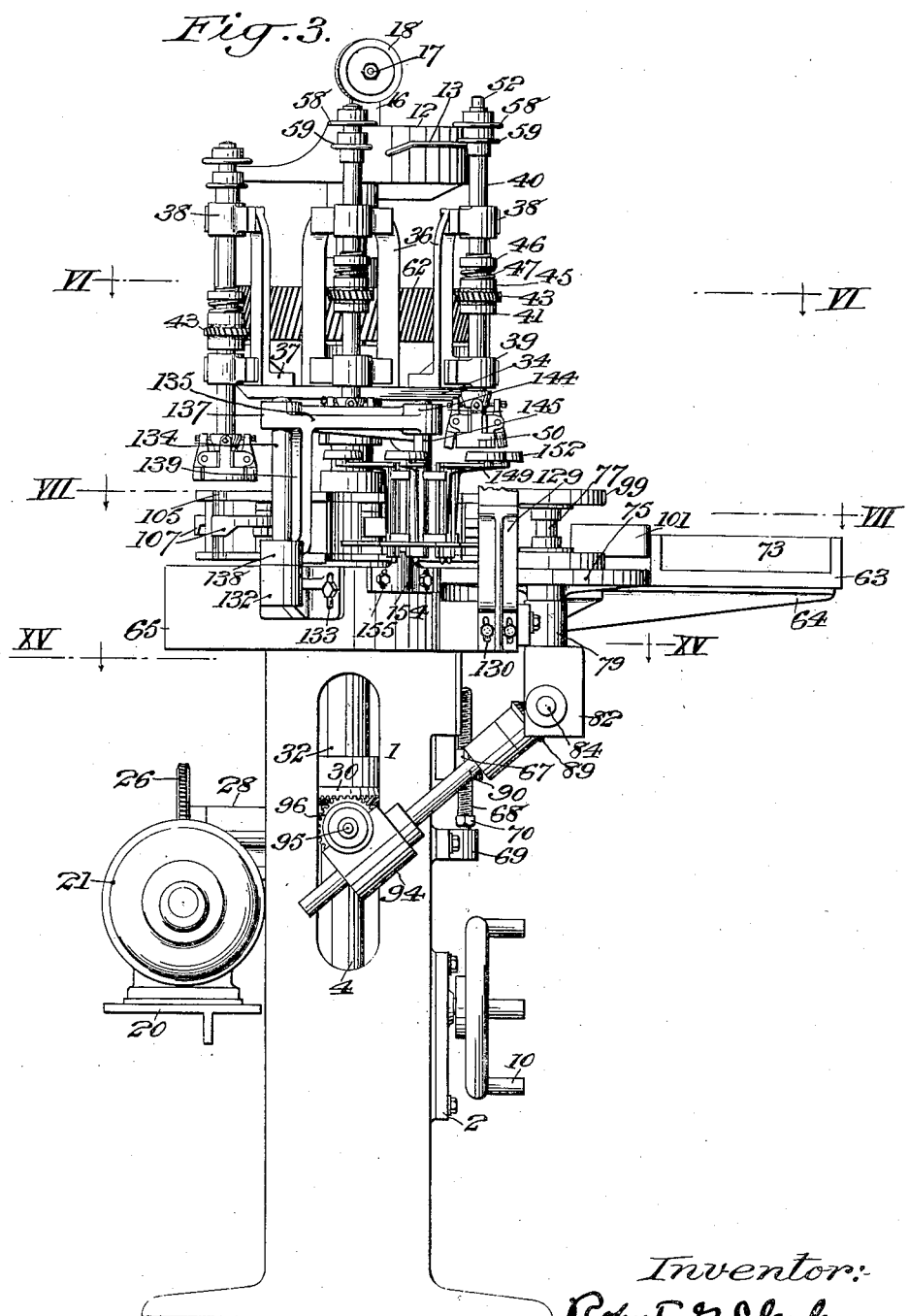
Fig. 3 represents a side elevation taken at right angles to Fig. 2.
Figure 4:
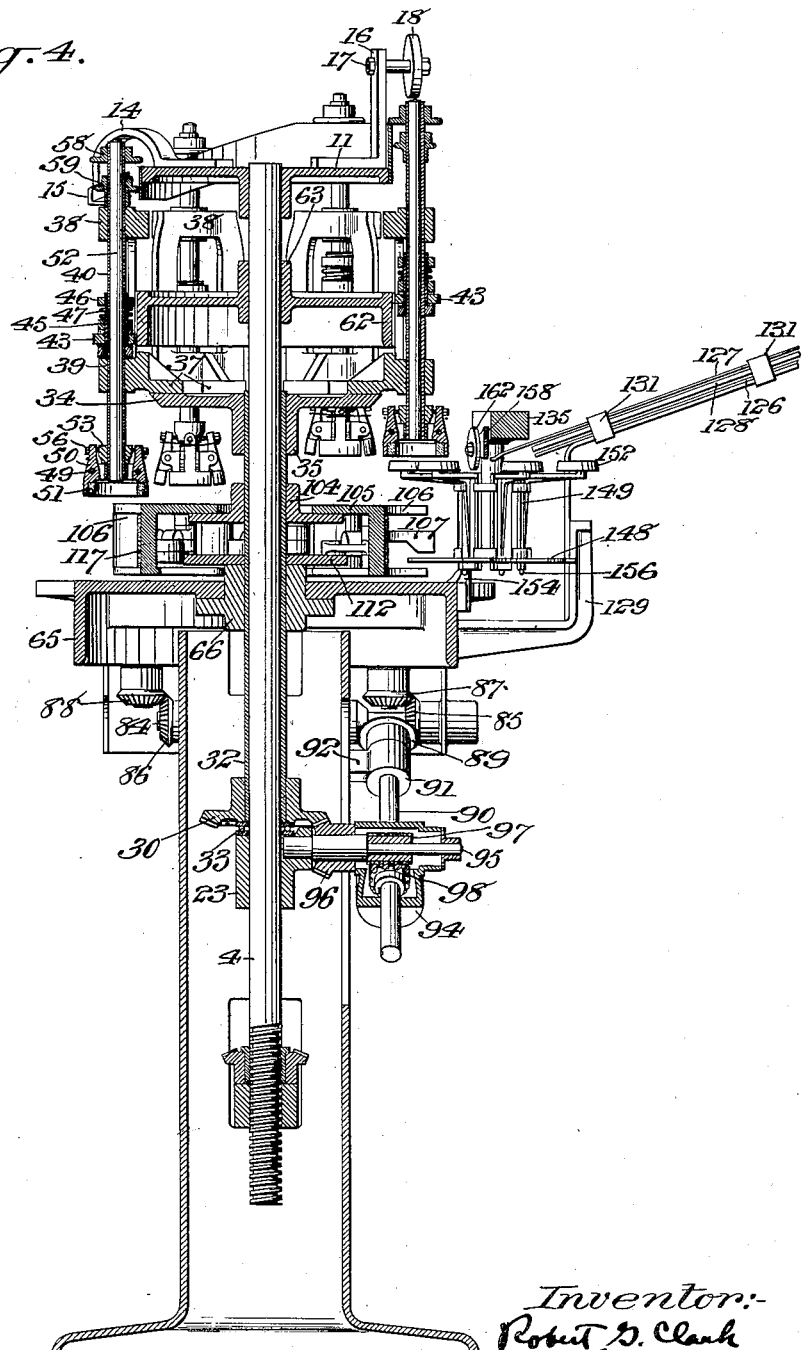
Fig. 4 represents a vertical, longitudinal section through the machine taken in the plane of the lines IV—IV of Fig. 1, looking in the direction of the arrows.

The shafts 77, 78 also carry immediately above the disks 75, 76, two pairs of feeding rolls 99, 100 (see Figs. 1 and 3). These rolls are preferably composed of some comparatively soft friction material such as wood, fibre or rubber, and are intended to contact with the sides of the receptacles so as to assist the disks 75, 76 in feeding them along. The inner side of the shelf 63 is provided with portions 101, 102 that project inwardly toward the rolls 99, 100, and the said side also carries a substantially triangular shaped portion 103, which projects inwardly between the said rolls and has its sides curved to conform substantially with the peripheries of the disks 75, 76. These parts just described serve as side guides to keep the receptacles in line as they are entering and leaving the machine.

Figure 7:
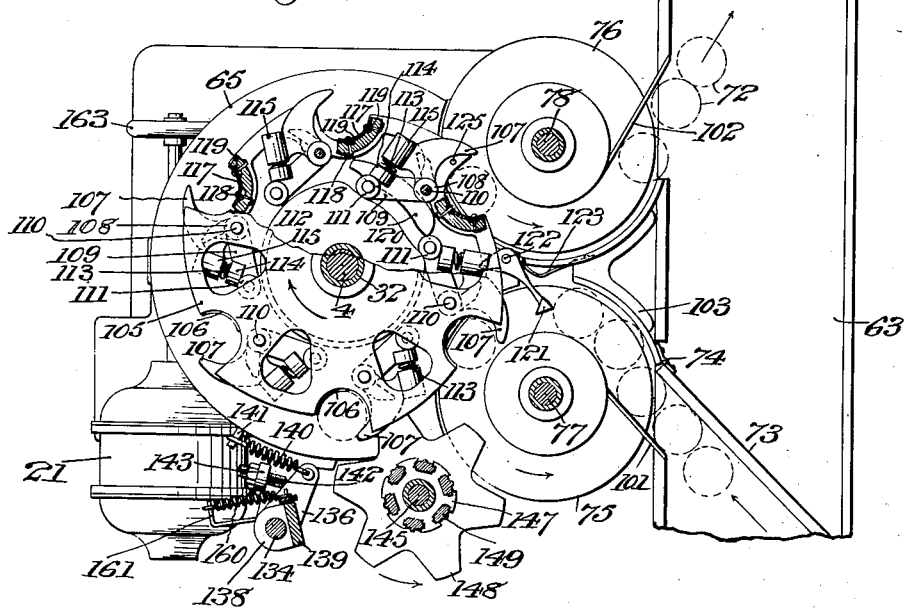
Fig. 7 represents a horizontal section taken in the plane of the lines VII—VII of Fig. 3, looking in the direction of the arrows.

As the receptacles are fed into the machine, they are carried onto the table 65, and slid around adjacent the circumference of the said table by mechanism which will now be described, reference being had to Figs. 2, 4, 5 and 7. This mechanism includes a flange 104, that is secured, as by a set screw, to the main shaft 32. A skeleton drum 105 is bolted, or otherwise fastened, to the said flange. This drum is notched at its periphery to form a series of six recesses 106, designed to loosely embrace the receptacles. Six movable jaws are secured in the said drum 105 between its upper and lower portions, and, as they are all alike, a particular description of one will suffice, reference being had to Fig. 7. Each jaw includes a gripping element marked 107, a hub 108 and a tail piece 109. The hub 108 is pivoted on a pin 110, which is fixed in the upper and lower portions of the drum 105, and the tail piece 109 is pivoted on the same pin 110. The tail piece is separate from the gripping element 107 so that the two can move independently on the pin 110. A roller 111 is secured at the end of the tail piece 109 and is yieldingly held against the periphery of a cam 112 by means of a spring 113 that is compressed between a lug 114 on the tail piece 109 and a spring housing 115, carried by the gripping element 107. The tension of this spring may be adjusted by means of a screw 116 (Fig. 5), which is threaded into the housing 115. The cam 112 is immovably fixed to the top of the bracket 66, so as to remain motionless while the gripping devices are revolved about it with the movement of the drum 105. That portion of the recess 106 which is opposite the gripping element 107 is cushioned by being provided with a yielding face 117 of material such as rubber (Fig. 7). This face of material is preferably secured to the wall of the recess by means of small nails 118, which are passed through and clinched on the outer side of the said wall. The holes through which the said nails pass are countersunk adjacent the rubber facing, as indicated at 119, in order to permit free yielding of the heads of the nails so as not to mar the receptacles.

As the receptacles are fed into the machine, it will be clear that they are adapted to be gripped between the rubber coated walls of the recesses 106 and the corresponding gripping elements 107, and thereby carried around in a circle on the table 65, as already mentioned. The cam mechanism which has been partly described, accomplishes this gripping of the receptacle. The direction of rotation of the skeleton drum is denoted by an arrow on Fig. 7, and it will be observed that, as the gripping elements 107 move away from the feeding disk 75, the rollers 111 on the tail pieces 109 pass along in engagement with the periphery of the cam 112, which corresponds with an arc of a circle for substantially three-quarters of its length. Throughout this travel, the springs 113 serve to swing the gripping elements 107 about the pins 108 so as to urge them toward the cooperating surfaces of the recesses 106 and thereby grip the receptacles, which are in the said recesses. When, however, the gripping elements approach the disk 76, which feeds the receptacles out of the machine, the rollers 111 on the tail pieces 109 engage a depressed portion of the cam 112 and are held in contact therewith by an outside cam 120, which engages the lower extremity of the pivots by which the rollers 111 are mounted on the tail pieces 109, as clearly shown in Figs. 16 and 17. This cam action serves to swing the tail pieces 109 and thereby move the gripping elements 107 away from the cooperating faces of the recesses 106, so as to release the receptacles and permit them to be carried away by the disk 76. The springs 113 are of such length that, when rollers 111 are held in engagement with the depressed portion of cam 112 by outside cam 120, the springs are no longer effective to retain the elements 107 in gripping position. This open position of each gripping element 107 is maintained until it comes to the feeding disk 75, when another receptacle is fed into position to be gripped by it, and carried around as already described.

In order to insure that the receptacles are fed to the machine one at a time, I provide a stop 121, (clearly shown in Figs. 1, 5, 6, 7, and on an enlarged scale in Figs. 18 and 19) which consists of an arm of right angle shape, that is pivoted on the table 65, as shown at 122. A spring 123 is fixed to the part 103 and serves to yieldingly hold the stop 121 in the path of the receptacles being carried by the disk 75, so as to resist their movement into the machine. The said stop has a nose 124, which lies in the path of travel of the gripping elements 107 and is intended to be acted upon by pins 125, which are fixed in and project downwardly from the skeleton drum 105, immediately in advance of each gripping element 107. The action of these pins contacting with the nose 124 of this stop arm 121 will cause it to swing about the pivot 122 and move out of the path of travel of the incoming receptacles, intermittently, as each gripping element 107 approaches the feed disk 75 in position to embrace an incoming receptacle. Thus, the mechanism acts positively to feed the receptacles into the machine one at a time without crowding. Fig. 1 shows the stop in its operative and inoperative positions in full and dotted lines.

The caps are supplied to the machine through a chute, which is shown in Figs. 1, 2, 4 and 20. This chute includes a lower member 126, an upper member 127 and side members 128. The lower member is supported by a bracket 129, which is secured to the table 65 by a bolt and slot connection, as indicated at 130, Fig. 3. This form of connection enables the said bracket, and hence, the chute, to be vertically adjusted. The several members composing the chute are held in proper relative position by clips 131. The inner extremities of the upper member 127 and side members 128 are composed of spring material, so as to resiliently engage the sides and top of each cap, and it will be observed that the upper member projects further inward toward the machine than do the sides, so that it is adapted to press each cap downwardly on to the means which receives it as said means passes under the chute. The chute may be supplied from a hopper (not shown) of any well known or approved form, in such manner that the caps pass downwardly through the chute so as to come to the end thereof right side up.

The machine includes mechanism for receiving caps from the chute and transferring them to the cap applying mechanism previously described. This mechanism is shown generally in Figs. 1, 2, 3 and 6, and is represented on an enlarged scale in Figs. 12, 13, and 20. It comprises a bracket 132, which is secured to the table 65 by bolt and slot connections, indicated at 133, so as to permit vertical adjustment. This bracket carries an upstanding pin 134, on which is pivoted a bell crank lever that has a relatively long upper arm 135 and short lower arm 136. The pivoting of this bell crank lever on the pin 134 is accomplished by a hub 137, which is formed in the arm 135 and embraces the upper part of the pin, together with a similar hub 138 formed in the lower arm 136 and embracing the lower part of the said pin. These two arms are connected by a vertical member 139, which assures that they shall move in unison. A retractile coil spring 140 (Fig. 6) is connected with the extremity of the lower arm 136 and to a pin 141 fixed in the periphery of the table 65, so as to yieldingly urge the bell crank lever to swing about the pin 134 so as to bring the outer end of the arm 135 toward the machine. An adjustable stop screw 142, which is carried by a lug 143 on the bracket 132, serves to limit this swinging movement.

The extremity of the upper arm 135 has a hub 144 in which is fixed a downwardly projecting pin 145 (see Figs. 3 and 12), which pin is enlarged at its bottom, as indicated by 146, so as to rotatably support a skeleton framework 147 thereon. To the bottom of the framework is secured a six pointed star wheel 148. A set of six slides 149 is mounted to reciprocate in the framework 147 and star wheel 148; the downward movement of each slide being limited by a shoulder 150, which contacts with the upper surface of the star wheel 148. These slides are all identical, and each one has, at its upper part, a laterally projecting arm in which is formed a bearing 151, that rotatably supports a head 152. These heads are preferably in the form of a truncated cone and are of just the proper size to readily pass into the caps, as clearly shown in Fig. 20, where the caps are marked 153 and two of them are shown as resting on the heads 152.

Figure 6:
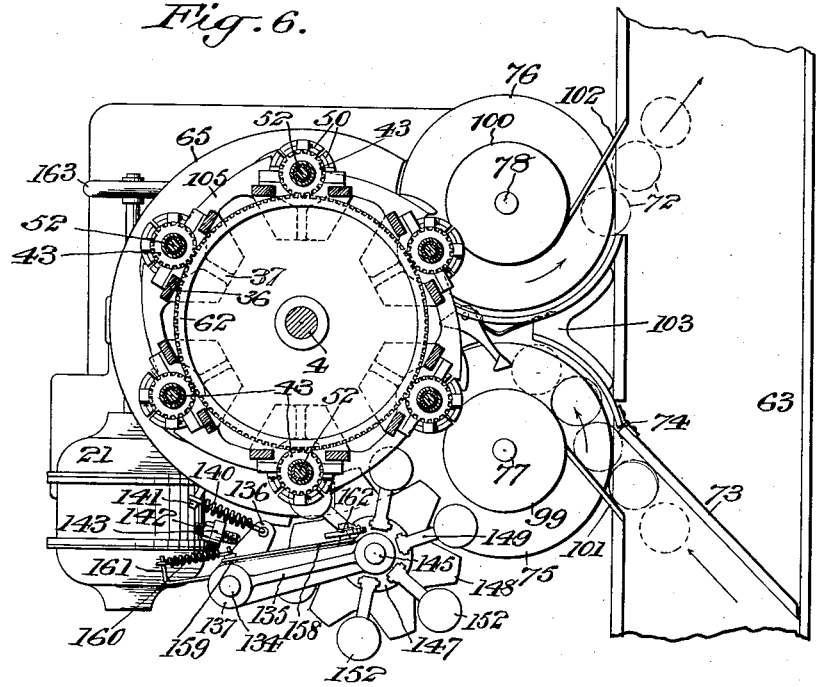
Fig. 6 represents a horizontal section taken in the plane of the lines VI—VI of Fig. 3, looking in the direction of the arrows.

As clearly shown in Figs. 6 and 7, the arm 135, and hence, the pin 145 which supports the star wheel 148, is held in such position that the innermost points of the star wheel lie in the path of travel of the receptacles being carried around on the table 65. Thus, each receptacle, as it passes, moves the star wheel and the parts connected thereto, one-sixth of a rotation, thereby imparting an intermittent rotation to the star wheel and to the slides carried thereby, while the machine is in operation. During this rotation, the lower extremities of the slides 149 will come in contact with a cam 154 (Fig. 12), which is adjustably secured by a bolt and slot attachment 155, to the table 65. The said lower extremities of the slides 149 are rounded, as clearly shown at 156, so as to enable them to cooperate with the cam 154, to the end that each slide may be momentarily raised the height of the cam as it comes in contact therewith. A small block 157 is fixed on the table 65 just inside of the cam 154, so as to positively force the slides 149 to ride upon the cam. In order to make sure that the slides 149 do not, for any reason, stick in an elevated position, I provide an angle arm 158, (Fig. 1), which is pivoted at 159 on the arm 135, and has its lower extremity connected to one end of a retractile spring 160, the other end of which engages a finger 161 that is projected rearwardly from the hub 138 of the arm 135. The free end of the upper part of the arm 158 carries a roller 162, which is arranged to engage the tops of the slides 149. It will be seen that the action of the spring 160 is to normally urge this roller 162 downwardly, so that it will positively force each slide 149 to its lower position, after passing over the cam 154.

In case, at any time, it is desired to briefly operate the machine by hand, a wheel 163 (Fig. 1) is provided on the projecting end of the motor shaft 25 to enable this to be done.

In operation, the machine is set in motion under influence of the motor 21, and caps and receptacles are supplied thereto, the caps passing through the chute and the receptacles being fed in from the table 63 onto the feed disk 75 as previously described. An incoming receptacle will be seized by a gripping element 107 and firmly held against rotation within one of the recesses in the rotary drum 105, so as to be carried around on the table 65. Concurrently, a cap will be pulled out of the end of the chute by a head 152 on one of the slides 149, which heads pass in their revolving movement immediately under the end of the chute. At the same time that the receptacle is being moved along the table 65, the cap applying device immediately above it, is also being similarly moved because it is also supported by and driven from the main shaft 32. Furthermore, the said cap applying device is held with its jaws open by reason of the engagement of the flanges 58 and 59 with the double cam 12; which engagement serves to hold the plunger 52 in its elevated position within the shaft 40, while the springs 57 yieldingly retain the jaws 50 open. It will also be observed, by reference to Fig. 1, that the upward trend of the upper cam 12 serves to elevate said cap applying device as it approaches the mechanism for feeding the caps. The continued movement of all these parts tends to bring the cap into axial alignment with and intermediate the receptacle and the cap applying device. At the time the cap is brought immediately beneath the said cap applying device, the slide 149, which carries the cap, engages the cam 154 and is thereby momentarily lifted so as to tuck the cap up into the jaws of the cap applying device. The rubber faces of the said jaws serve to retain the cap therein when the slide, which was carrying it, is forced down by the roller 162 after passing over the cam 154. Continued movement of the parts moves the head 152, which was carrying the cap, out of alignment with the receptacle and cap applying device so as to enable the cap to be applied to the receptacle, but the cap and receptacle are maintained in axial alignment with each other. Immediately thereafter, the flange 59 on the plunger 52 comes to the end of the rib cam 13, which end tapers downwardly as clearly shown in Figs. 8 and 9. This permits the plunger 52 to drop down within the shaft 40, and bring the jaws 50 into gripping engagement with the cap. This movement of the plunger 52 is rendered positive by the rubber roll 18, with which the plunger contacts at this juncture, as shown in Fig. 10. The next instant, the flange 58 reaches a sharply depressed portion of the upper edge of the double cam 12 and the cap applying device at once drops downwardly, thereby forcing the cap axially onto the receptacle.

During the revolving movement of the cap applying devices around the machine, in conjunction with the receptacles, the gears 43 carried by the said devices, remain in mesh with the large helical gear 62, with the result that the said small gears 43 are caused to rotate and thereby rotate the cap applying devices on their own axes. This rotation of the cap applying device, the operation of which is being described, provides the necessary movement for screwing the cap on the receptacle, which operation takes place immediately after the application of the cap to the receptacle by the downward movement of the applying device just mentioned. It may be noted at this juncture that the downward movement of the cap applying devices which takes place, owing to their weight, when the steeply depressed portion of the upper edge of the double cam 12 is reached, as already described, is assisted by the angular arrangement of the teeth on the large helical gear 62.

This screwing of the cap onto the receptacle takes place during the continued movement of the receptacle around on the table 65 and, when the application has been completed, the friction clutch, composed of the elements 41, 42, 44, 45, 46 and 47, which holds the gear 43 in engagement with the shaft 40, will slip so that the rotation of the cap applying device will cease, thereby avoiding any injury to the parts.

Figure 2:
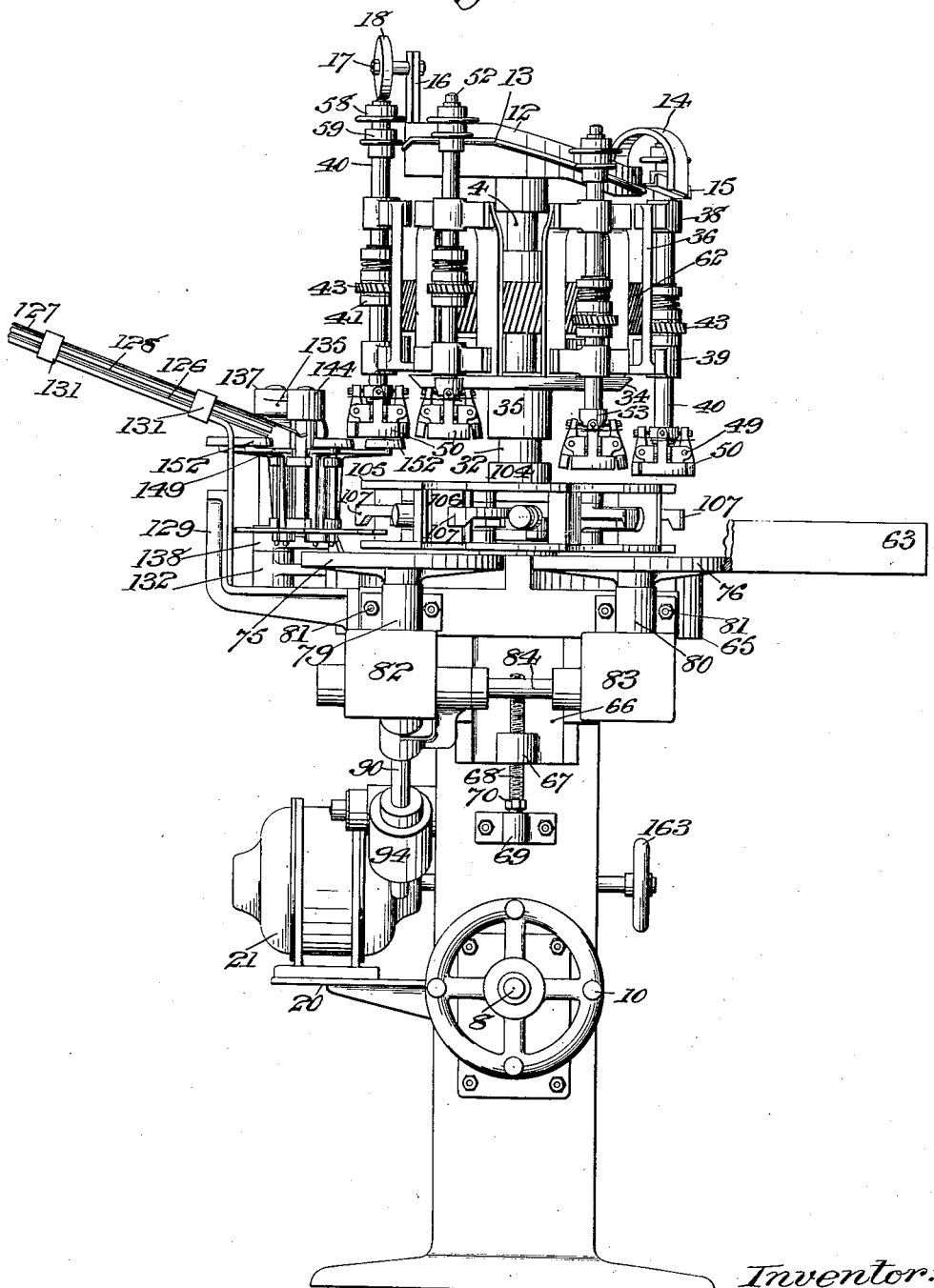
Fig. 2 represents a side elevation thereof, parts being removed to expose other parts.

This cap applying operation is completed before the roller 111 on the tail piece 109 of the gripping element 107 reaches the depressed portion of the cam 112. At the time the said roller reaches this depressed portion of the cam, the gripping element 107 is moved so as to release the capped receptacle, as already set forth. During all the travel of the parts following the first application of the cap to the receptacle, the flange 58 rides on a low even portion of the upper edge of the cam 12, while the flange 59 is entirely free of the cam rib 13. However, at substantially the same time that the roller 111 encounters the depressed portion of the cam 112, as just described, the flange 59 comes to the beginning of the cam rib 13 where the latter is supplemented by the cam section 15 carried by the yoke 14 (Fig. 2). At once thereafter the said flange 59 starts to ride up on the cam rib 13, and thereby raises the plunger rod 52 and permits the jaws 50 to be moved out of gripping engagement with the cap on the receptacle, by means of the spring 57. This initial contact of the flange 59 with the cam rib 13 is rendered positive by the presence of the said cam section 15. Following this releasing of the receptacle gripping mechanism and cap applying device, the capped receptacle is carried away from the machine by the disk 76.

It should be said that all these operations take place very rapidly, so that the sequence thereof is scarcely discernable. This is particularly true with respect to the provision of the caps to the cap applying devices and the immediate application thereof to the receptacle. These steps are represented consecutively in Figs. 8, 9, 10 and 11, which will be clearly understood in view of the foregoing description. Furthermore, it may be noted that it is necessary to run in one or two receptacles in order to actuate the star wheel 148 of the cap feeding mechanism, before the actual capping operations will begin.

The adjustment provided for the rod 4 and parts carried thereby, the table 65 and parts carried thereby, as well as for the cap feeding and delivering mechanism, enables the machine to be adapted for operation upon receptacles of various heights.

I desire it to be understood that various changes may be resorted to in the form, construction and arrangement of the several parts without departing from the spirit and scope of my invention; and hence, I do not intend to be limited to the details herein shown and described except as they may be included in the claims.

What I claim is:

1. A machine of the character described comprising, a series of capping devices, means for revolving said capping devices, a support for holding receptacles adjacent said capping devices, means for revolving said support, cap delivering mechanism, said mechanism including a series of revolvable heads, means for causing the revolving movement of the receptacles to revolve said heads to bring them successively into operative position with respect to the capping devices, and means for intermittently elevating said heads to cause them to enter the capping devices.

2. A machine of the character described comprising, a capping device for applying screw caps to containers, means for feeding receptacles to said device, a plurality of members rotatable in a substantially horizontal plane for delivering caps to said device, means for forcing said cap delivering means into said device to position said caps therein.

3. In a machine of the class described, the combination of a capping device for applying screw caps to receptacles, means for feeding receptacles to said device, a plurality of members rotatable in a substantially horizontal plane for delivering caps to said device, a chute for delivering caps to said rotatable members, and means for rotating said device to screw said caps to containers.

4. In a machine of the class described, the combination of a capping device, means for delivering receptacles to said device, means rotatable in a substantially horizontal plane for delivering caps to said device, means for raising said rotatable means to place caps into said device, and means for operating said capping device to apply caps to containers.

5. In a machine of the character described, the combination of a capping device, means for feeding receptacles to said device, means rotatable in a substantially horizontal plane having a plurality of members thereon for delivering caps to said device, means for raising said members individually to force caps into said device, and means for operating said capping device to apply the caps forced thereinto to containers.

6. In a machine of the character described, the combination of a capping device having a plurality of heads for applying screw caps to receptacles, means for feeding receptacles to said device, means for delivering caps to said capping heads, cam means for forcing said cap delivering means into said capping heads, and means for operating said capping heads to screw caps on to containers.

7. In a machine of the character described, the combination of a capping device for applying screw caps to containers, cap delivering mechanism, said mechanism including a series of heads, means for revolving said heads to bring them successively into cap receiving position, and means for successively elevating said heads to place the caps in said capping device.

8. In a machine of the character described, the combination of a capping device for applying screw caps to containers, cap delivering mechanism, said mechanism including a series of heads adapted to fit within the caps, means for revolving said heads to bring them successively into cap receiving position, and means for successively elevating said heads.

9. In a machine of the class described, the combination of capping devices for applying screw caps to receptacles, means for revolving said capping devices, a support for holding receptacles adjacent asid capping devices, means for revolving said support, and a cap delivering mechanism, said mechanism including a series of revolvable heads, means for causing a revolving movement of the receptacles to revolve said heads to bring them successively into operative position with respect to the capping devices.

10. In a machine of the character described, the combination of a series of capping devices for screw caps revolvable about a common axis, a support for revolving receptacles beneath said capping devices, cap delivering mechanism, rotatable in a horizontal plane for delivering caps to said capping devices, and an inclined chute for delivering caps to said cap delivering mechanism.

11. In a machine of the character described, the combination of a plurality of rotating cap applying devices for attaching screw caps to containers, a plurality of rotatable heads adapted to pass beneath said cap applying devices, and means for raising said heads to place caps within said cap applying devices.

12. In a machine of the class described, the combination of a series of capping heads rotatable about a common axis, and a series of cap delivering heads movable in a vertical direction and rotatable about an axis parallel to said first axis to position caps under said capping heads.

13. In a machine of the class described, the combination of a series of capping devices rotatable about a common axis, a series of cap delivery heads rotatable about an axis parallel to said first axis, and means for moving said delivery heads upwardly successively to place caps within said capping devices.

14. In a machine of the class described, the combination of a capping device, a rotatable frame having a plurality of members thereon, a cap delivering means mounted adjacent said frame and over the path of said members whereby each of said members is adapted to remove a cap from said delivery means, and means for rotating said frame to deliver said caps to said capping device.

15. In a machine of the class described, the combination of a cap delivering means, a capping device, a rotatable frame having a plurality of members thereon adapted to move under and to receive caps from said cap delivery means, and to deliver said caps to said capping head, and means for moving said capping members upwardly into said capping heads to force the caps thereinto.

16. In a machine of the class described, the combination of a capping device comprising a plurality of jaws, means having a plurality of members movable in both vertical and horizontal directions for delivering a cap to said jaws, means for closing said jaws about said cap, means for moving said jaws holding said cap into engagement with a container, and means for rotating said jaws to apply a cap thereto.

17. In a machine of the class described, the combination of a capping device having a plurality of jaws, means having a plurality of heads adapted to fit into caps and movable in vertical and horizontal directions to place the caps in the jaws for delivering a cap to said jaws, means for closing said jaws about said cap, and mechanism for moving said head into operative relation with a container while said cap is secured therein, to apply a cap thereto.

18. In a machine of the class described, the combination of a frame having a plurality of cap delivery members thereon movable in a vertical direction, capping devices for applying screw caps to receptacles and means for conveying receptacles, said frame being actuated by said receptacles to deliver caps to said capping devices.

19. In a machine of the class described, the combination of a capping device comprising a plurality of jaws, means having a plurality of members movable both in a vertical and horizontal direction for delivering a cap to said jaws, means for closing said jaws about said cap, means for moving said capping device into operative relation with a container, and means for rotating said capping device to apply a cap thereto, said means being driven through a yieldable connection whereby the rotation of the capping device stops when a predetermined resistance is offered.

20. In a machine of the class described, the combination of a continuously rotated capping device for applying screw caps to containers, said devices comprising a plurality of jaws, means for opening and closing said jaws, means for raising and inserting a cap within said jaws, said jaws being adapted to support said cap while in open position, cam members for operating said opening and closing means, said cam members being adapted to close said jaws at the commencement of the screwing operation and to open said jaws at the termination of the screwing operation in applying the cap to the container.

21. In a machine of the class described, the combination of capping devices having jaws to grip and support a cap while in open position, means for rotating said capping devices continuously and for revolving said devices about a central axis, mechanism for forcing said capping devices downward to apply a downward pressure on the cap while it is being screwed to the container, and devices for opening said jaws during rotation thereof to release the cap upon the termination of the application of the cap to the container.

22. In a machine of the class described, the combination of cap applying devices, means for revolving said cap applying devices about a central axis, mechanism for rotating said cap applying devices continuously, said cap applying devices comprising a plurality of jaws to hold and support a cap while in open position, a shaft supporting said jaws, a sleeve on said shaft having a conical member movable back and forth for opening and closing the jaws, and cam actuating means adapted to move said sleeve relative to said shaft to open and close said jaws.

23. In a machine of the class described, the combination of cap applying devices, means for revolving said cap applying devices about a central axis, mechanism for rotating said cap applying devices continuously, said cap applying devices comprising a plurality of jaws, a shaft supporting said jaws, a sleeve on said shaft having a conical member movable back and forth for opening and closing the jaws, and cam actuating means adapted to move said sleeve relative to said shaft to open and close said jaws, and a roller mounted above said shaft to press it downwardly forcibly during the application of the cap to the container.

In testimony, that I claim the foregoing as my invention, I have signed my name this 20th day of January, 1922.

ROBERT G. CLARK.